May 31, 1960
R. A. CALENDINE ET AL
2,938,940
CABLE SPLICING SLEEVE
Filed April 16, 1958
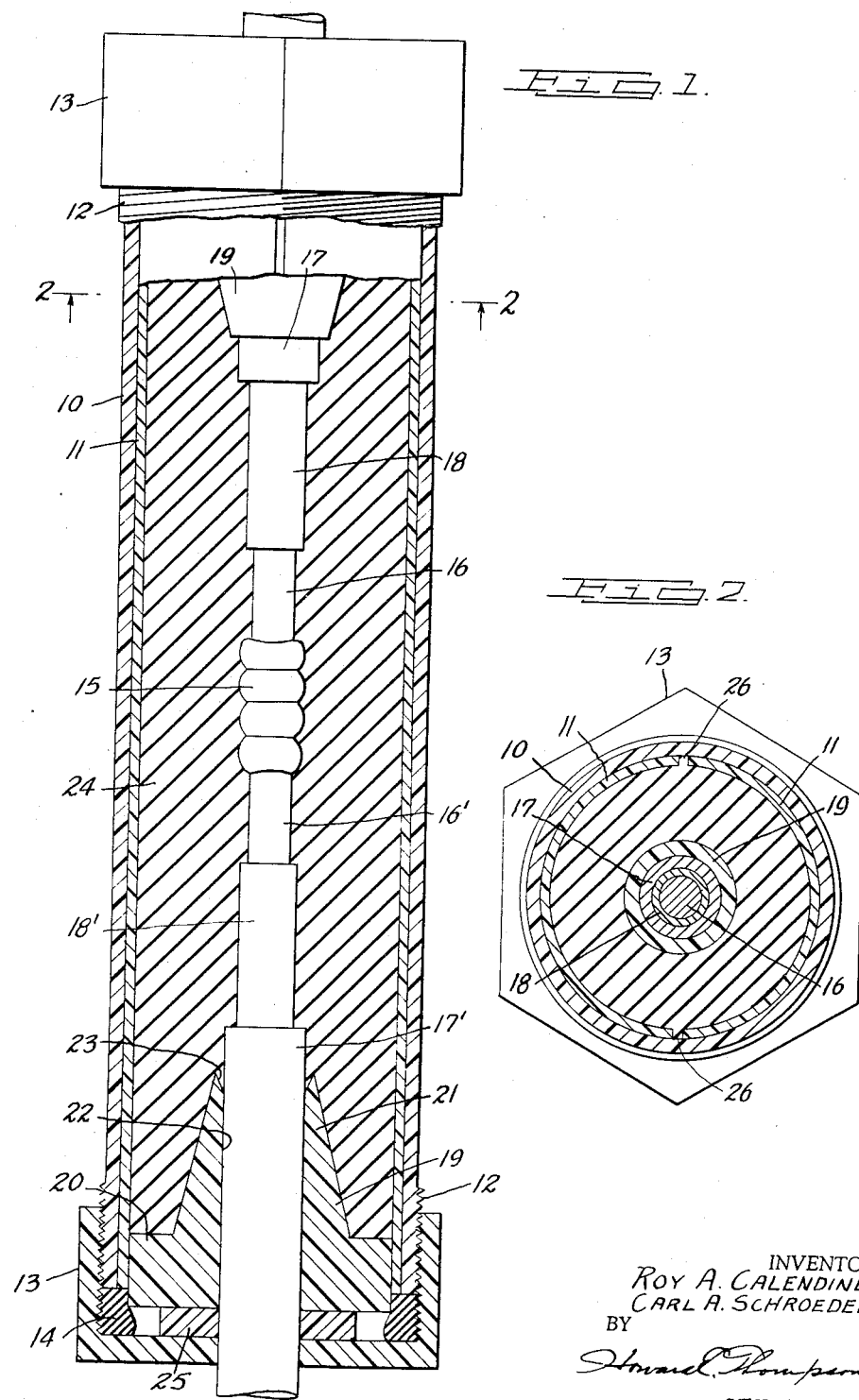
INVENTOR.
ROY A. CALENDINE
CARL A. SCHROEDER
BY
Howard E. Thompson
ATTORNEY

United States Patent Office 2,938,940
Patented May 31, 1960

2,938,940

CABLE SPLICING SLEEVE

Roy A. Calendine, 21 Morningside Drive, Croton on Hudson, N.Y., and Carl A. Schroeder, 144—35 Northern Blvd., Flushing, N.Y.

Filed Apr. 16, 1958, Ser. No. 729,013

3 Claims. (Cl. 174—76)

This invention relates to sleeves or sleeve assemblages, preferably of plastic material, used in forming an insulating and protective sleeve around spliced cable. More particularly, the invention deals with a structure of the character described wherein a body of readily flowable material is arranged around the splicing and within the sleeve, with a pair of compacting plungers or members movable into end portions of the sleeve in completely filling and packing said flowable material around the cable and cable splicing in providing a complete seal of the cable within the sleeve.

The novel features of the invention will be best understood from the following description, when taken together with the accompanying drawing, in which certain embodiments of the invention are disclosed and, in which, the parts are designated by suitable reference characters.

Fig. 1 is a longitudinal sectional view through a splicing sleeve device made according to the invention, with parts of the construction broken away and in elevation; and Fig. 2 is a section on the line 2—2 of Fig. 1.

In practice, we provide a sleeve body comprising an outer circumferentially continuous elongated tube or sleeve 10 and a supplemental inner longitudinally split or two-part sleeve 11, both sleeves being substantially of the same length. The outer sleeve has externally threaded end portions as at 12 for adjustable coupling of nut-like caps 13 therewith, and between the end walls of the caps and the ends of the sleeves 10 and 11 are disposed neoprene or other sealing rings, one of which is indicated at 14 at the lower portion of Fig. 1 of the drawing.

At 15 is diagrammatically shown the splicing between two cables 16, 16' and in forming the splicing, part of the outer insulation or cable wrappings 17, 17' are removed to leave short sections of inner wrappings 18, 18' adjacent the stripped cable 16, 16', as diagrammatically seen in Fig. 1 of the drawing.

Arranged and operating in end portions of the inner sleeve 11 are compacting plungers or members 19, one member being shown in section at the bottom of Fig. 1 and the other one in partial elevation at the top of Fig. 1.

The members 19 include annular portions 20 fitting snugly within the sleeve 11. The members include inwardly extending conical portions 21 and an aperture 22 for reception of the cable, including the insulation portion 17, 17' thereof.

The aperture or bore 22 has at its inner end an outwardly flared portion, as seen at 23, so that in compacting the flowable material 24 within the cylinder 11 part of this material is free to extend into the beveled portions 23 to pack itself around the insulation 17, 17' of the cables to effect a seal therearound. The conical portions 21 form wedge-like members which aid in the compacting of the material within the sleeve 11 as will be understood.

The material 24 will preferably be any type of material free to be moved by the members 19 in what could be termed a flowable manner, and such materials as a non-hardening rubber putty formed from synthetic rubber are suitable for such use.

Arranged between end walls of the caps 13 and the members 19 are washers 25 for applying pressure on the members 19 in movement of these members inwardly by actuation of the nuts 13, and in this operation the neoprene washers 14 may be compressed to an extent, as diagrammatically illustrated in Fig. 1 of the drawing. These washers also aid in effecting a seal which in combination with the material 24 will prevent moisture or the like from entering the sleeves and contacting the splicing of the cable.

In some instances, the compacting of the material 24 in the sleeve 11 can result in part of this material extending between the split adjacent ends of the two-part sleeve 11, as diagrammatically seen at 26 in Fig. 2 of the drawing. In other words, the complete sleeve 11 may be slightly less in diameter than the bore of the sleeve 10 to permit the slight extension of the sleeve parts in the manner illustrated in Fig. 2 of the drawing.

In use of our improved device the procedure which would preferably be followed would be to arrange the parts 13, 14, 25 and 19 on the portions 17, 17' of the cables to be spliced together beyond the point of splicing and the outer circumferentially continuous sleeve 10 would be arranged upon one of the cables. Thus it would be preferred to position the members 19 in an approximately properly spaced relationship to each other so that the ends of the sleeve parts 11 are capable of resting upon the portions 20 of the members 19 and then the flowable and still workable material 24 is applied to the splicing, the portions of the cables 18, 18' and 17, 17' that are exposed between the members 19. A more or less measured body of this material is so applied; whereupon, the two sleeve halves 11 are placed around the material 24 and compressed sufficiently to bring these parts into abutting engagement with the outer ends 20 of the members 19, whereupon the sleeve 10 is moved over the sleeve parts 11 and aligned with the ends of said parts 11, whereupon the pressure washers 25 and rings 14 are moved into position upon the members 19, and ends of the sleeves 10 and 11. Then the nuts 13 are threaded upon the threaded ends 12 of the sleeve 10 and moved inwardly until such time as the material 24 is completely packed within the chamber of the sleeve parts 11 around the cable and the members 19. The drawing of the nuts 13 into a tightly compressed position will designate the firm packing of the material 24 within the sleeve structure.

While our improved device can be made of different materials, it is preferred from the standpoint of lightness, economy, and insulating factors that the parts 10, 11, 13, 19 and 25 be composed of plastic material and, for this reason, these parts have been so sectioned, but this sectioning is not to be regarded as a limitation but simply illustration of the preferred form of construction. In this connection, it will also be apparent that combinations of materials can be used. In other words, some of the parts can be plastic and other parts metal or other materials.

Having fully described our invention, what we claim as new and desire to secure by Letters Patent is:

1. A device of the character described comprising an elongated cable splicing housing sleeve having threaded end portions, the bore of the sleeve being of one diameter throughout its length, caps adjustable on said threaded end portions, a body of flowable material arranged within the sleeve and around the spliced cable, members arranged within and movable longitudinally of end portions of said sleeve and encircling said cable, means between the caps and said members for pressure movement of said members into the sleeve in compacting said flowable material in the sleeve and around said spliced cable in insulating and moisture-proofing the splicing within said sleeve, a supplemental split sleeve disposed within and extending the major portion of the length of the first-named sleeve, and said members having portions fitted snugly in said supplemental sleeve.

2. A device of the character described comprising a main circumferentially continuous elongated sleeve having a one diameter bore throughout its length, a supplemental split sleeve arranged within and extending the major portion of the length of the bore of the first named sleeve, a pair of plunger members mounted snugly in end portions of the supplemental sleeve and movable longitudinally thereof for compacting flowable material arranged within said split sleeve, and means adjustable on end portions of the first named sleeve operatively engaging said plunger members for movement of the same inwardly in end portions of said split sleeve.

3. A device of the character described comprising a main circumferentially continuous elongated sleeve having a one diameter bore throughout its length, a supplemental split sleeve arranged within and extending the major portion of the length of the bore of the first named sleeve, a pair of plunger members mounted snugly in end portions of the supplemental sleeve and movable longitudinally thereof for compacting flowable material arranged within said split sleeve, means adjustable on end portions of the first named sleeve operatively engaging said plunger members for movement of the same inwardly in end portions of said split sleeve, said members having reduced inwardly extending conical portions, the members having a bore extending therethrough, the inner end of bore of each member terminating in outwardly flared portion and a sealing ring disposed between ends of said sleeves and the first named means.

References Cited in the file of this patent

UNITED STATES PATENTS

| | | |
|---|---|---|
| 2,337,800 | Cassen | Dec. 28, 1943 |
| 2,621,228 | Tompers | Dec. 9, 1952 |
| 2,876,322 | Boggs | Mar. 3, 1959 |

FOREIGN PATENTS

| | | |
|---|---|---|
| 693,371 | Great Britain | July 1, 1953 |
| 1,013,740 | Germany | Aug. 14, 1957 |